United States Patent
Baker et al.

(10) Patent No.: US 11,049,416 B2
(45) Date of Patent: Jun. 29, 2021

(54) INJECTION SIMULATION DEVICE AND METHOD

(71) Applicants: Jeff Baker, Orlando, FL (US); Francis Michael Siemer, Orlando, FL (US); Christopher Wai Yin Chung, Orlando, FL (US)

(72) Inventors: Jeff Baker, Orlando, FL (US); Francis Michael Siemer, Orlando, FL (US); Christopher Wai Yin Chung, Orlando, FL (US)

(73) Assignee: NOBLE INTERNATIONAL, LLC, Orlando, FL (US)

(*) Notice: Subject to any disclaimer, the term of this patent is extended or adjusted under 35 U.S.C. 154(b) by 546 days.

(21) Appl. No.: 15/546,546

(22) PCT Filed: Jan. 26, 2016

(86) PCT No.: PCT/US2016/014987
§ 371 (c)(1),
(2) Date: Jul. 26, 2017

(87) PCT Pub. No.: WO2016/123144
PCT Pub. Date: Aug. 4, 2016

(65) Prior Publication Data
US 2018/0005547 A1    Jan. 4, 2018

Related U.S. Application Data

(60) Provisional application No. 62/107,805, filed on Jan. 26, 2015.

(51) Int. Cl.
G09B 23/00    (2006.01)
G09B 23/28    (2006.01)
(Continued)

(52) U.S. Cl.
CPC ........... *G09B 23/285* (2013.01); *G09B 9/00* (2013.01); *G09B 23/30* (2013.01)

(58) Field of Classification Search
None
See application file for complete search history.

(56) References Cited

U.S. PATENT DOCUMENTS

| 5,071,353 A | 12/1991 | Van Der Wal |
| 7,901,377 B1 | 8/2011 | Harrison et al. |

(Continued)

FOREIGN PATENT DOCUMENTS

| DE | 102005062610 | 6/2007 |
| DE | 102005062611 | 6/2007 |

(Continued)

OTHER PUBLICATIONS

International Search Report and Written Opinion for PCT Application PCT/US16/014987 dated Nov. 14, 2016, 1 pp. 1-13.
(Continued)

*Primary Examiner* — James B Hull
(74) *Attorney, Agent, or Firm* — Timothy H. Van Dyke; Wolter Van Dyke Davis, PLLC (57) ABSTRACT

An injection simulation device for simulating one or more forces of an injection is provided herein. The device may include a housing and a retractable injection simulation member associated with the housing, wherein the retractable injection simulation member retracts according to a multi-phase force profile. The multi-phase force profile includes a first phase configured to simulate a deformation force of pressing a needle against a subject so as to deform at least a first layer of tissue prior to traversing at least the first layer of tissue of the subject, a second phase configured to simulate a puncture rebound force, and a third phase configured to simulate an insertion force.

17 Claims, 8 Drawing Sheets

(51) Int. Cl.
*G09B 9/00* (2006.01)
*G09B 23/30* (2006.01)

(56) References Cited

U.S. PATENT DOCUMENTS

| | | |
|---|---|---|
| 8,342,851 B1 | 1/2013 | Speeg et al. |
| 2006/0008786 A1 | 1/2006 | Feygin et al. |
| 2011/0144594 A1 | 6/2011 | Sund et al. |
| 2012/0015336 A1 | 1/2012 | Mach |
| 2012/0040320 A1 | 2/2012 | Nadeau |
| 2013/0236872 A1 | 9/2013 | Laurusonis et al. |
| 2017/0004737 A1 | 1/2017 | Baker et al. |

FOREIGN PATENT DOCUMENTS

| | | |
|---|---|---|
| EP | 2784766 | 1/2014 |
| EP | 3335213 | 6/2018 |
| WO | 2014/145535 | 9/2014 |
| WO | 2014/164948 | 10/2014 |
| WO | 2016/123144 | 8/2016 |
| WO | 2017/007850 | 1/2017 |
| WO | 2017027753 A1 | 2/2017 |

OTHER PUBLICATIONS

International Search Report and Written Opinion for PCT Application PCT/US18/17300 dated Aug. 24, 2018, pp. 1-7.
Extended European Search Report for EP Application P16743991.8, dated Jun. 20, 2018, pp. 1-8.
Nam, S. et al, (2010). Factors associated with psychological insulin resistance in individuals with Type 2 diabetes. Diabetes Care, 33, 1747-1749.
Noble, "Helix—Concept Refinement", InSight Presentation, pp. 1-7 (2016).
Noble, "Helix—Greaseless Damping Concepts", InSight Presentation, pp. 1-10 (2017).
Zambanini, A. et al, (1999). Injection related anxiety in insulin-treated diabetes. Diabetes Research and Clinical Practice, 46, 239-246.
EP16743991.8; Search Report; dated Jul. 21, 2020, 9 pages.

INJECTION SIMULATION DEVICE AND METHOD

BACKGROUND

The use of needles and instruments containing needles are widespread in the medical industry. Needle insertion into a patient is an essential component of many clinical procedures such as biopsies, injections, neurosurgery, and cancer treatment methods. The success of these procedures depends on accurate placement and insertion of the needle into a target region of a patient. Accuracy of an injection can be hampered by certain factors, including a fear of needles and/or injections leading to failure to administer an injection, or improper administration of an injection, and lack of knowledge and/or experience in administering injections to oneself or to others which may also lead to improper injection administration.

Increased use of biologic and large molecule drugs has driven the demand for prefilled syringes and other drug delivery systems. Prefilled syringes are combination products used in home and institutional settings by patients and health care providers (HCP). Failure to effectively use a prefilled syringe can result in errors that adversely affect the safe and full delivery of a prescribed dose. Training users of prefilled syringes and other drug delivery systems serves as an attractive strategy to mitigate errors and support the commercial objectives of syringe products and other medication administration products in the market.

Injectable medications are required for a number of varying illnesses and diseases. Many injectable medications require self-injection by a patient. Self-injection of a medicament using a device having a needle carries with it a certain stigma. Oftentimes users are weary of injecting the subject (whether it be themselves or another patient) with an injection device for fear or anxiety related to failing to deliver a complete dose of the medication, anticipated pain associated with injecting the subject with the needle, fear of accidentally sticking themselves with the needle during manipulation of the injection device, and difficulties in adequately grasping the dosing mechanism or injection device to inject the subject, among other concerns. An additional concern exists in instances in which users with little or no medical knowledge or experience are required to inject themselves or another subject using these devices. Performing a medical treatment or test using a device having or requiring a needle carries with it certain risks and often creates a level of anxiety for the user performing the treatment or test and/or for the subject receiving the treatment or test.

Injections are often a source of fear and apprehension for injection providers as well as patients receiving injections. Studies suggest that as many as one-fifth to one-third of people with diabetes, for example, are hesitant or unwilling to give themselves insulin injections for reasons that include needle anxiety[1,2,3]

[1] Zambanini, A., Newson, R. B., Maisey, M., Feher, M. D. (1999). Injection related anxiety in insulin-treated diabetes. *Diabetes Research and Clinical Practice*, 46, 239-246.
[2] Klobassa, N., Moreland, P. (2012, Jan. 10). Psychological insulin resistance stems from fear. MayoClinic.com Living with Diabetes Blog, Message posted to http://www.mayoclinic.com/health/psychological-insulin-resistance/MY01165
[3] Nam, S., Chesla, C., Stotts, N. A., et al. (2010). Factors associated with psychological insulin resistance in individuals with Type 2 diabetes. *Diabetes Care*, 33, 1747-1749.)

It has proven beneficial in the medical field to practice various medical techniques prior to administering a medical treatment, particularly when it relates to medical treatments by way of injections or other invasive drug delivery means. This has been found particularly beneficial when the medical treatment is being self-administered by a patient, but also beneficial when a user is administering an injection to another subject. Training devices are helpful in reducing anxiety associated with administering medical treatment, as well as increasing efficiency and accuracy in providing the medical treatment to subjects.

Medical devices can be intimidating to use; the fear associated with giving oneself an injection, for example, can be traumatic. This fear is increased in persons with little or no experience in self-administration of medications. Consequently, devices to assist in training individuals to inject themselves or otherwise self-administer medication are beneficial in decreasing or preventing any anxiety associated with medicament delivery. Interactive software is one method that is currently used to train and teach caregivers how to use needles and administer injections. Software programs which provide this capability, however, fail to provide hands on injection training. Furthermore, most of the interactive software programs are used by healthcare professionals, and are not typically available to the general public. Oftentimes, patients who are required to self-administer an injection are provided with nothing more than a pamphlet or a video instruction demonstrating how to deliver the injection.

SUMMARY

In an embodiment, an injection simulation device including a housing and a retractable injection simulation member is provided herein. The injection simulation member is configured to simulate a needle of an injection device with a determined gauge (G) and the device is configured such that the injection simulation member retracts from an extended position to a retracted position upon application of a force$_1$ (N), to simulate a deformation force (Force$_d$) according to Force$_d$=C(−0.046(G)+1.83). The force value ranges between +/−1%-30% and every integer in between, and wherein C comprises a coefficient, said coefficient being a factor of the deformation force of the injection simulation device.

In another embodiment an injection simulation device for simulating one or more forces of an injection is provided herein. The device may include a housing, a retractable injection simulation member associated with the housing, wherein the retractable injection simulation member retracts according to a multi-phase force profile. The multi-phase force profile includes a first phase configured to simulate a deformation force, the deformation force simulating the force of pressing a needle against a subject so as to deform at least a first layer of tissue prior to traversing at least the first layer of tissue of the subject, a second phase configured to simulate a puncture, and a third phase configured to simulate an insertion force, wherein the insertion force includes the force required for a needle to traverse the tissue to a target injection location.

In another embodiment, an injection simulation device configured to simulate forces applied to an injection device during an injection event is provided. The injection simulation device may include a housing, an injection simulation member configured to simulate a needle of an injection device with a determined gauge, and which device is configures such that the injection simulation member retracts from an extended position to a retracted position upon application of a force (N). The device includes a resistance mechanism which may provide one or more resistance values as the injection simulation member is retracted, to simulate one or more forces applied during an injection wherein the resistance increases as the injection simulation member is retracted to simulate a deformation force until a first threshold force value is reached, wherein upon reaching the first threshold force value, the resistance may decrease to simulate a puncture force, in an embodiment. Following the decrease in resistance, the resistance may increase as the injection simulation member is retracted to simulate an insertion force, wherein the one or more forces depend on one or more variables including needle gauge, needle length, needle bevel, needle coating, needle sharpness, lubrication of the needle, or one or more characteristics of a tissue traversed by a needle, or a combination thereof.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 12 provides a cross-sectional view of the embodiment of the injection simulation device shown in FIG. 11.

FIG. 13 provides a cross-sectional view of the embodiment of the injection simulation device shown in FIG. 11.

DETAILED DESCRIPTION

The inventors have found that a need exists for an injection device which may be safely and efficiently used by patients and healthcare providers, both with and without medical experience alike, to use for practicing delivering an injection. Furthermore, the inventors have found that a device which closely resembles and simulates the look and feel of an injection device that can be used to simulate an injection for training purposes in order to increase injection compliance and decrease anxiety associated with delivering injections would be highly beneficial. These goals, in addition to creating a safe training device which solves many of the issues found in the prior art are achieved by embodiments of the subject invention as provided herein.

Definitions

The term "injection device," as used herein refers to any device used to deliver medicament by way of parenteral administration. These injections include, but are not limited to intramuscular (IM), intravenous (IV), subcutaneous (SC), inravitreous, intraosseous infusion, intracerebral, intra-arterial, intracerebroventricular, intrathecal, among other injection types. The injection simulation device may include structural and/or functional features to simulate an auto injector in a non-limiting embodiment, or a prefilled syringe in another non-limiting embodiment, for example. Other injection devices may also be simulated by the injection simulation device embodiments described herein.

Those skilled in the art will understand that the term gauge (G) refers to a gauge of a needle according to gauges known in the art. Typical gauge ranges used in the equation (s) provided herein will include gauges ranging between approximately 18-34.

During an injection, a user of an injection device having a needle encounters various forces. Oftentimes, the first force encountered is that which is required to traverse a first layer of tissue (oftentimes the skin) with the needle, the pressure required by the user on the needle until the needle traverses the user's first layer of tissue is called a deformation force, which is the force that deforms the skin until the needle punctures the skin. This force required increases as the skin becomes deformed. Following the deformation force, there is often a temporary and typically brief decrease in force on the needle during an injection, known as the puncture force, which is the force that occurs once the needle has traversed the skin, i.e., punctured the skin, and before the needle moves further into the tissue of the patient. A third force often encountered during an injection follows the puncture force, and is termed an insertion force. The insertion force is an increasing force on the needle as the needle traverses tissue of the patient to reach a target location in the patient required for the injection. The increase in force over time typical of the insertion force period occurs as the needle travels through the tissue and can be attributed to an increase in pressure on the needle as it passes through multiple layers of tissue on its trajectory to the target injection location in the patient. These forces are often surprising and unexpected to an inexperienced injection provider, whether it is a patient who is self-administering an injection or a medical personnel administering an injection to a patient. Embodiments of the invention as described herein are provided to accurately simulate these forces, among other features of an injection and an injection device to decrease anxiety associated with administering an injection.

In an embodiment, an injection simulation device is provided to allow for a simulated injection experience during use of the injection simulation device without puncturing the skin of a user. The injection simulation device may include an injection simulation member may include a blunt end probe or other similar object known in the art provided to mimic the sound, look, and/or feel of the injection by an injection member in a training or simulation session allowing a user to train oneself for administering an injection without puncturing the skin of the user. One skilled in the art would realize that the injection simulation member can be made of any materials known in the art to, in some embodiments, provide a flexibility, and tensile modulus to simulate a needle while maintaining the rigidity and stability to provide a simulated sensation of an injection without traversing the skin of a user. The injection simulation device provides a perception to a user of injection into the skin and mimics or simulates an actual injection during retraction of the injection simulation member from an extended position to a retracted position upon application of a force, to simulate an injection without traversing or puncturing the skin of the user.

In trying to simulate an actual medicament delivery or injection device, the device herein requires a force by the user for activation of the device (i.e., for initiating an injection). Multiple forces can be simulated by the device such as a force that is required (e.g. manual, spring loaded, electric motor, pneumatic cartridge, ultrasonic, or other type of force) to deliver a needle through tissue of a user using a prefilled syringe or other injection device, in non-limiting examples. In other examples, the forces similar to those encountered when using an auto injector or other injection device may be simulated with the injection simulation device embodiments described herein. The injection simulation device may simulate different forces in order to provide a simulated injection event by accurately simulating the forces encountered when using a medicament delivery device having a needle.

Embodiments of the injection simulation device may provide tactile, visual, and auditory stimuli to a user, wherein during use of the injection simulation device, the tactile, visual, gustatory, olfactory, or auditory feedback, or any combination thereof, are synchronized in a manner such that a needle-containing injection delivery device is accurately simulated. The synchronization of the stimuli is a significant factor in facilitating multisensory learning of the user.

The injection simulation device embodiments described herein may include components which provide a tactile/force reflecting mechanism (i.e., resistance mechanism) to provide force feedback to simulate the feel of an injection device used during an injection. Force feedback is typically accomplished by a tactile/force reflecting mechanism that imparts force to a user of the injection simulation device in response to manipulation of the injection simulation device. The force(s)/resistances that may be generated as a user manipulates the injection simulation device against a surface simulate the forces/resistances encountered during an injection at a target location of a user.

Multiple forces are encountered during an injection, and these forces are often influenced by one or more variables including needle gauge, needle length, injection angle needle point, needle coating or other surface characteristics, lubrication of needle or injection site, needle depth in patient tissue, type of patient tissue (i.e., skin, muscle), characteristics of patient tissue which may be influenced by age, health, weight, and/or genetically determined variables, among other potential force-influencing variables.

Forces that may be encountered during an injection are simulated in embodiments of the injection simulation device provided herein. Forces that may be encountered during an injection include a deformation force, a puncture rebound force, an insertion force, a relaxation force, and an extraction force or any combination thereof. A deformation force may occur when a needle is pressed onto a surface of a tissue, for example, an outer surface of the epidermal layer of a patient, causing the epidermis to deform under the pressure of the needle prior to puncture of the epidermis by the needle. A puncture rebound force refers to the force that is sensed once the needle traverses the tissue of the subject. It has been discovered that this causes a temporary decrease in force during an injection. An insertion force can be described as the force of the injection after the needle traverses the tissue, and until the needle reaches its target depth in the patient tissue. In some instances, the insertion force is the greatest increase in force over time during the course of an injection. A relaxation force typically follows the insertion force. The relaxation force occurs once the needle has reached its target depth in the patient tissue and the medicament is injected into the target tissue. The relaxation force is marked by a decrease in force that occurs as the medicament is expelled through the needle. An extraction force is one which is felt during removal or retraction of the needle from the tissue, and is marked by a greater decrease in force over time than the relaxation force, in some non-limiting instances.

Embodiments of the resistance mechanism described herein may include different components in different embodiments. In non-limiting embodiments, the resistance mechanism may include multiple components, such as, a combination of structural features of the injection simulation device which move relative to one another to produce a resistance during a simulated injection which mimics the forces encountered by a user during an injection with an injection device, for example. The resistance produced may be controlled by manipulating the shape(s) of one or more of the structural features, or the surface(s) characteristics of the one or more structural features, or the material(s) of the one or more structural features, in non-limiting embodiments.

The resistance mechanism may alternatively include a material traversable by a needle, for example, to produce a varying resistance to mimic the forces and the tactile feel of an injection. This traversable material may be disposed within the housing of the injection simulation device or on an outer portion thereof. Traversal of the needle through the traversable material may provide a tactile feel of a needle traversing a tissue of a subject during an injection. Furthermore, the traversal may be viewable by the user of the device, providing a visual and tactile representation to simulate an injection event. The material may include a rubber or septum material, or a pseudo-skin material, in non-limiting embodiments, to further enhance the simulation of penetrating tissue.

In another embodiment, a resistance mechanism may include a pneumatic system, wherein a build-up of air in the injection simulation device housing occurs as the injection simulation member is retracted, so as to cause a pneumatic resistance to the retraction of the injection simulation member to simulate an injection.

In one embodiment, an injection simulation device including a housing and a retractable injection simulation member, said injection simulation member configured to simulate a needle of an injection device with a determined gauge (G) and which device is configured such that the injection simulation member retracts from an extended position to a first retracted position under application of a $force_1$ (N), to simulate a deformation force ($Force_d$) according to the formula $Force_d = C(-0.046(G)+1.83)$, wherein the force value ranges between +/−1%-30% and every integer in between, and wherein C comprises a coefficient, said coefficient being a factor of the deformation force of the injection simulation device. In another embodiment, the force value ranges +/−1%-20% and every integer in between. In yet another embodiment, the force values ranges +/−1%-10% and every integer in between. The value of C is further defined below. In one non-limiting embodiment, the value of C may include a value between 0.2-3.6.

In a further embodiment, the retraction of the injection simulation member from the extended position to the first retracted position comprises a force determined by the formula $F(x)=K*X^P$ wherein $F(x)$ is a force value at a point between the extended position and the first retracted position, K is a resistance value including a resistance of the injection simulation device, X is a displacement value, and P is an exponential power value greater than zero. $F(x)$ may be a force value simulating a deformation force in one embodiment. In another embodiment, $F(x)$ may be a force value simulating an insertion force.

In an alternative non-limiting embodiment, $F(x)$ is a force value at a point between the extended position and at least a second retracted position. $F(x)$ denotes F as a function of (x). In non-limiting embodiments described herein, $F(x)$ denotes a Force at point x.

In another embodiment, the injection simulation device is provided wherein the deformation force $F_d$ depends on one or more factors including: a composite area of injection value (C1), a bevel of the needle value (C2), lubrication of the needle or an injection site value (C3), and/or injection angle (C4) wherein a force of the device is determined by the formula $C=C1*C2*C3*C4*C5$.

In one embodiment, the C1 value includes a higher value when the composite area of injection includes a more dense tissue area and a lower value when the composite area of injection includes a less dense tissue area. For example, muscle tissue includes a more dense tissue than in adipose tissue; consequently, the C1 value would be higher for muscle tissue than it would be for adipose tissue. In one non-limiting example, when the composite area of injection includes a subcutaneous tissue, the C1 value ranges from 0.5-2.0.

In a further embodiment, the injection simulation device may be configured to simulate a force based on a needle bevel, wherein the C2 value is higher when a needle with a bevel that creates a larger angle at a distal end of the needle is simulated, and lower when a needle with a bevel that creates a smaller angle at the distal end of the needle is simulated. In a non-limiting example, the C2 value ranges from between 0.5-1.5.

In still a further embodiment, the injection simulation device may be configured to simulate a force based on lubrication or non-lubrication of a needle or an injection site, and wherein the C3 value is higher when an un-lubricated needle and/or injection site is simulated and lower when a lubricated needle and/or injection site is simulated. In one non-limiting example, the C3 value ranges from between 0.5-1.0.

In yet a further embodiment, the C4 value decreases when a longitudinal axis of the injection simulation member is generally perpendicular to a plane in which a surface including the injection site is disposed, and increases when an angle between the longitudinal axis of the injection simulation member and the plane in which the surface including the injection site decreases. In a non-limiting example, the C4 value includes 1.0 when the angle between the longitudinal axis of the injection simulation member and the plane of the surface including the injection site comprises 90 degrees. In another non-limiting example, the C4 value includes 1.4 when the angle between the longitudinal axis of the injection simulation member and the plane of the surface including the injection site comprises 45 degrees.

The exponential value, P, is a value that may affect the change in force exponentially, where as the P value increases, the force value may increases exponentially. In a non-limiting embodiment, the P value may range between 0.5 and 4.

The displacement value, X, is a position of the injection simulation member as it moves between extended and retracted positions. In one non-limiting embodiment, the X value ranges between 0.000001 mm and 250 mm.

In an embodiment, an injection simulation device for simulating one or more forces of an injection, the device including a housing; and a retractable injection simulation member associated with the housing, configured to simulate a needle of an injection device with a determined gauge. The device is configured such that the injection simulation member retracts from an extended position to a retracted position upon application of a force according to a multi-phase force profile. The multi-phase force profile may include at least a first phase configured to simulate a deformation force, the deformation force simulating the force of pressing a needle against a subject so as to deform at least a first layer of tissue prior to puncturing at least the first layer of tissue of the subject; and at least a second phase configured to simulate a puncture rebound force, in a non-limiting embodiment. In one embodiment, the second phase includes a force that is less than the deformation force.

The device may further include at least a third phase configured to simulate an insertion force, wherein the insertion force includes the force required for a needle to traverse the tissue to a target injection location of the subject. The target injection location includes a location wherein the injection is to occur, such as, muscular tissue, intra-ocular tissue, subcutaneous tissue, adipose tissue, intra or inter peritoneal tissue, inter or intra venous or arterial tissue, among other target locations for injections known to those skilled in the art.

In a further embodiment, the injection simulation device includes one or more additional phases configured to simulate puncturing of composite tissue areas. Composite tissue areas may include multiple layers of tissue that may be traversable, wherein multiple deformation, puncture, and insertion forces are required to reach the target location for the injection. Certain procedures such as an amniocentesis, for example, used in prenatal diagnosis of chromosomal abnormalities, fetal infections, or sex determination from a sample of amniotic fluid containing fetal tissues retrieved from the amniotic sac using a needle in the procedure, require passage through multiple layers of tissue to reach the target location. These procedures may include multiple phases and multiple forces which are experienced and which may be simulated in embodiments of the injection simulation device provided herein.

In a further embodiment, an injection simulation device configured to simulate forces applied to an injection device during an injection event includes a housing, an injection simulation member, the injection simulation member is configured to be retracted from an extended position to a first and/or second retracted position in response to a force on said injection simulation member. The injection simulation device further includes a resistance mechanism, wherein the resistance mechanism may provides one or more resistance values (one or more forces) as the injection simulation member is retracted, to simulate one or more forces applied during an injection event. The resistance may increase as the injection simulation member is retracted to simulate a deformation force until at least a first retracted position is reached, wherein upon reaching the first retracted position, the resistance decreases to simulate a puncture rebound force, following the decrease in resistance, the resistance increases as the injection simulation member is retracted to simulate an insertion force until at least a second retracted position is reached, wherein said one or more forces are configured to simulate one or more variables affecting one or more forces during an injection, including needle gauge, needle length, needle bevel, needle coating, needle sharpness, lubrication of the needle, angle of the needle relative to a target site, or one or more characteristics of a tissue traversed by a needle, or a combination thereof.

In a further embodiment, the resistance mechanism may include a first engaging component having a first interfacing surface and a second engaging component having a second interfacing surface, the first and second interfacing surfaces being configured to interface with one another, wherein an interface between the first and second engaging components is configured to provide a resistance on a movement of the first engaging component and the second engaging component relative to one another. The first engaging component may be associated with a portion of the injection simulation member and the second engaging component may be associated with a portion of the housing, wherein a force is required to move one of the first engaging component or the second engaging component relative to the other of the first engaging component or the second engaging component when contact is made between the first interfacing surface and second interfacing surface, said force simulating a deformation force and/or an insertion force of an injection.

The device may further include a biasing member for providing a resistance on the retraction of the injection simulation member. In a further embodiment, the resistance provided by the biasing member during retraction of the injection simulation member to at least the first retracted position simulates the deformation force of an injection, and wherein the first and second engaging components move relative to one another as the injection simulation member is retracted to at least the second retracted position to provide a resistance to simulate an insertion force.

In another embodiment, the resistance mechanism includes a digressive spring. In a further embodiment, the digressive spring comprises a Belleville spring, wherein the Belleville spring is compressed as the injection simulation member is retracted and a resistance on the retraction of the injection simulation member increases until the Belleville spring reaches a threshold compression level, wherein upon reaching the threshold compression level, the resistance on the injection simulation device decreases.

In still another embodiment, the resistance mechanism may include a needle component and a needle-traversable material, wherein upon exerting a force on the injection simulation member to retract the injection simulation member from an extended position to a retracted position, the needle component traverses the needle-traversable material to provide a tactile feedback and/or a resistance to simulate the feel of a needle traversing a tissue of a patient. In one particular embodiment, the needle-traversable material may include a pseudo skin material.

In a further embodiment, the resistance mechanism may include a resistance membrane disposed within the housing such that the injection simulation member contacts the resistance membrane as the injection simulation member is retracted from an extended position to a retracted position in response to a force on the injection simulation member. During retraction of the injection simulation member, the movement of the injection simulation member relative to the resistance membrane provides a resistance on the injection simulation member to simulate a deformation force and/or an insertion force of an injection. Upon releasing the force on the injection simulation member, the biasing member may cause the injection simulation member to be extended from a retracted position to an extended position to reset the injection simulation device.

In another embodiment herein, a method for simulating an injection on a user with an embodiment of the injection device is provided herein. In a further non-limiting embodiment, a method for simulating an injection comprising applying an injection simulation device to a location on a subject, wherein the device comprises a retractable injection simulation member and is configured such that a force applied to retract the injection simulation member is representative of an actual injection device. In an alternative embodiment, non-linear forces are required to retract the needle thereby simulating insertion in one or more layers of tissue. In still a further non-limiting embodiment, a method for simulating an injection comprising providing differential resistances based on, injection angle, needle length, needle point, needle coating, lubrication of needle or injection site, needle depth into composite tissue, or a combination thereof is provided herein.

Figure 1:
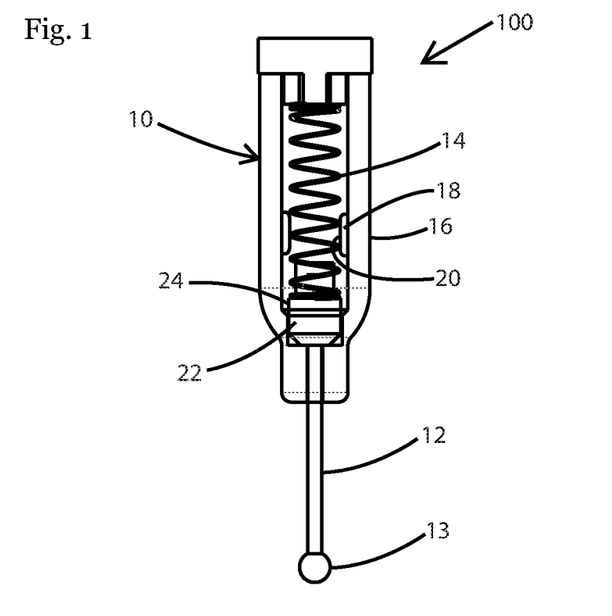
FIG. 1 is a cross-sectional view of an embodiment of an injection simulation device in an extended position.
Figure 2:
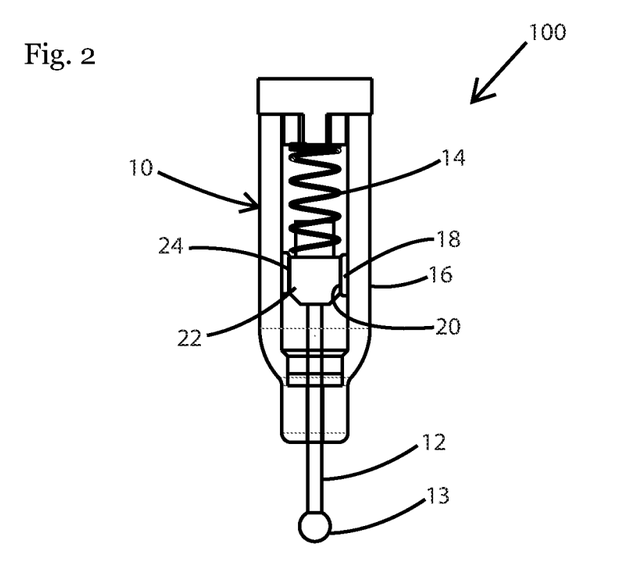
FIG. 2 is a cross-sectional view of the embodiment of the injection simulation device of FIG. 1 in a retracted position.

Turning to the Figures, FIG. 1 is a cross-sectional view of an embodiment 100 of an injection simulation device 10 having a housing 16 and a retractable injection simulation member 12. The injection simulation member 12 retracts in response to a force or pressure on the member 12. The injection simulation member 12 may include a distal end 13 having a blunted, or ball-end shape, in other non-limiting embodiments. The injection simulation member 12 may be formed of a flexible material in further non-limiting embodiments, such as a monofilament material in a non-limiting example. FIG. 2 is a cross-sectional view of the embodiment 100 of the injection simulation device 10 of FIG. 1 in a retracted position, wherein the injection simulation member 12 has been retracted into the housing 16. The injection simulation device 10 may further include a resistance mechanism. The resistance mechanism may include either a biasing member 14, and/or first and second engaging components 18, 22, in one embodiment as shown in FIGS. 1-2 which may interface with one another to provide a resistance to simulate the use of an injection device as shown in FIGS. 1-2.

The first engaging component 18 may include a first interfacing surface 20 and the second engaging component 22 may include a second interfacing surface 24, wherein the first and second interfacing surfaces 20, 24 are configured to interface with one another and through this interface, the resistance on the movement of the injection simulation member 12 relative to the housing 16 may be controlled as the second engaging component 22 moves in a linear direction relative to the first engaging component 18 in a first direction as the injection simulation member 12 is retracted. A force is required to move the second engaging member 22 relative to the first engaging member 18 when contact is made between the first interfacing surface 20 and second interfacing surface 24, wherein the force may simulate an insertion force of an injection, in a non-limiting embodiment. FIG. 2 shows a view of the contact between the interfacing portions of the first engaging component 18 and second engaging component 22 with the biasing member 14 activated. In a non-limiting embodiment, the biasing member 14 may provide a resistance on the retraction of the injection simulation member 12 to mimic or simulate that of a deformation force during an injection as described above, and the resistance provided by the interface between the first and second interfacing surfaces 20, 24, as the injection simulation member 12 continues to retract may simulate an insertion force of an injection device.

Figure 3:
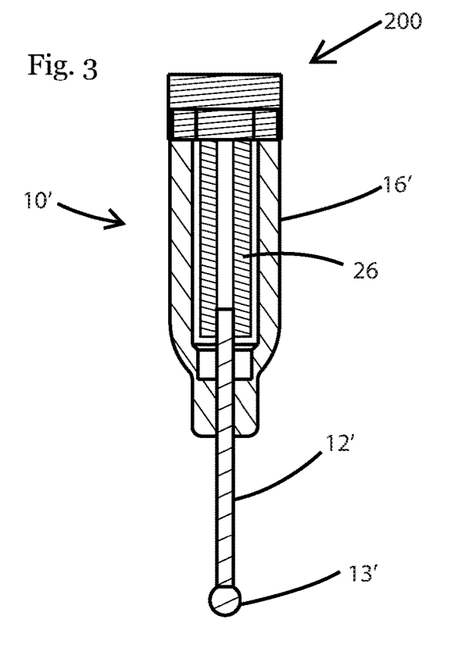
FIG. 3 is a cross-sectional view of another embodiment of an injection simulation device in an extended position.

FIG. 3 is a cross-sectional view of another embodiment 200 of an injection simulation device 10' in an extended position. The injection simulation device 10' includes a housing 16' and an injection simulation member 12' having a distal end 13'. As aforementioned, the distal end 13' may include a blunted end, a rounded or generally-spherical distal end, or any other type of feature that would prevent puncturing the skin of a user. The embodiment 200 may include a resistance mechanism including a resistance membrane 26 disposed within the housing 16' of the injection simulation device 10'. The resistance membrane 26 may be disposed on one portion of the housing 16' or may cover the inner surface of the housing 16', in non-limiting embodiments. The resistance membrane 26 may be configured to contact a portion of the injection simulation member 12' as the injection simulation member 12' moves relative to the housing 16' to create a resistance to simulate the force(s) required, and the resistance encountered, in administering an injection. The resistance membrane 26 may cover at least a portion of the inner surface of the device 10' housing 16', in one embodiment. In non-limiting embodiments the resistance membrane 26 may include a rubber material, a material having a textured surface, or any other type of material, that when in contact with the injection simulation member 12', would create a resistance for a user of the device 10'. In an alternative or an additional embodiment, the injection simulation member 12' may include a material which may include a textured surface, in a non-limiting example, to provide a resistance to a user of the device 10' during retraction of the injection simulation member 12'.

Figure 4:
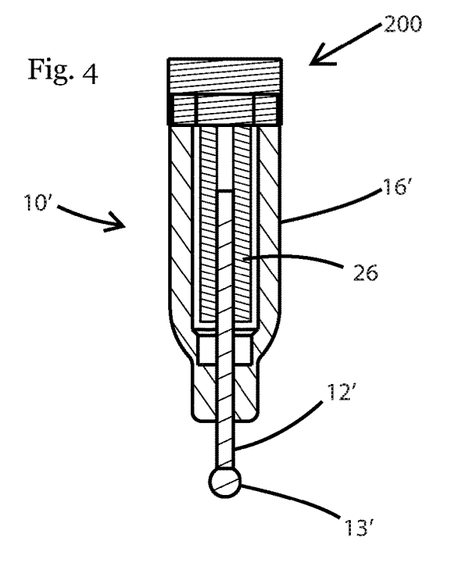
FIG. 4 is a cross-sectional view of the embodiment of the injection simulation device of FIG. 3 in a retracted position.

FIG. 4 is a cross-sectional view of the embodiment 200 of the injection simulation device 10' of FIG. 3 showing the injection simulation member 12' in a retracted position, wherein the injection simulation member 12' is retracted into the housing 16'. This retracted position may be a first retracted position during simulation of a deformation force, and the injection simulation member may retract further to at least a second retracted position during simulation of an insertion force. Additional retracted positions before, between or after the first and second retracted positions discussed herein may be achieved by the injection simulation member. The resistance provided by the resistance membrane 26 may simulate one or more forces encountered during an injection including: deformation force, puncture rebound force, insertion force, or a combination thereof, in non-limiting embodiments.

Figure 5:
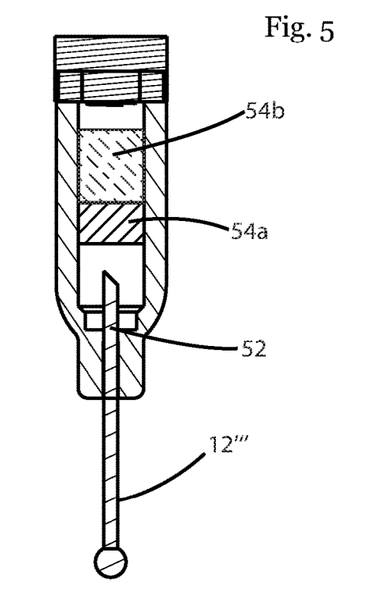
FIG. 5 is a cross-sectional view of an embodiment of an injection simulation device in an extended position.
Figure 6:
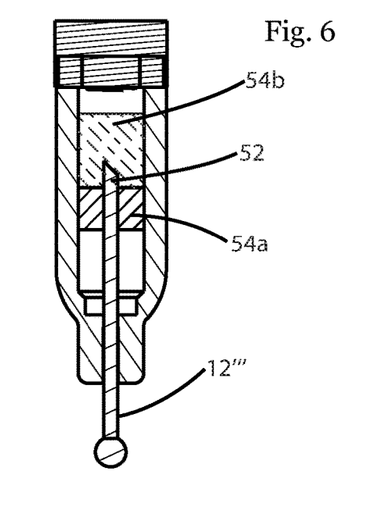
FIG. 6 is a cross-sectional view of the embodiment of the injection simulation device of FIG. 5 in a retracted position.

In a further embodiment of the injection simulation device 300 as shown in the cross-sectional views of FIGS. 5-6, the device comprises an injection simulation member 12''' and a resistance mechanism. The injection simulation member 12''' may include a needle component 52, and at least a portion of the resistance mechanism may include a needle-traversable material 54a, 54b. Multiple layers having varying densities of needle-traversable material 54a, 54b may be provided. In one embodiment, one layer of needle-traversable material may be provided wherein the one layer includes varying densities so as to provide a varied force on the needle component 52 as the needle component traverses the material. In a further, non-limiting embodiment, one layer of needle-traversable material may be provided, in which the layer includes one density to provide a force on the needle component 52 as the needle component traverses the material.

FIG. 5 provides a view of the needle component 52, wherein the injection simulation member 12''' is in an extended position. As the injection simulation member 12''' is retracted into the housing 10" of the injection simulation device, the needle component 52 may traverse (i.e., pierce through) the needle-traversable material 54a, 54b to create a resistance on the injection simulation member 12''' to simulate a deformation force and an insertion force of an injection. In a non-limiting embodiment, traversal of the needle component 52 across the needle traversable material 54a may create a force to simulate a deformation force, and traversal through the needle traversable material 54b may create a force to simulate an insertion force, for example. Additional layers of material may be provided to simulate additional forces.

In the embodiments 200, 300 provided herein, a feature on the injection simulation member or on the housing, or both, may be provided to prevent the injection simulation member from releasing from the housing. For example, a small cap or component on the proximal end of the injection simulation member may secure the injection simulation member within the housing when the member is in an extended position as shown in FIG. 3, for example.

Figure 7A:
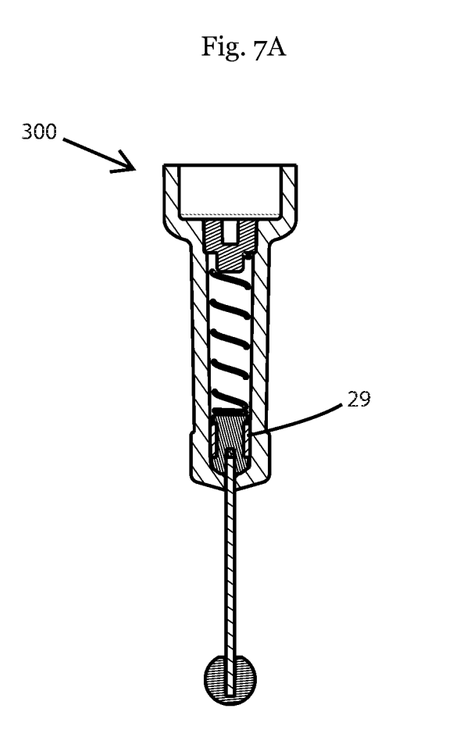
FIGS. 7A-7B include cross-sectional views of another embodiment of an injection simulation device.
Figure 7B:
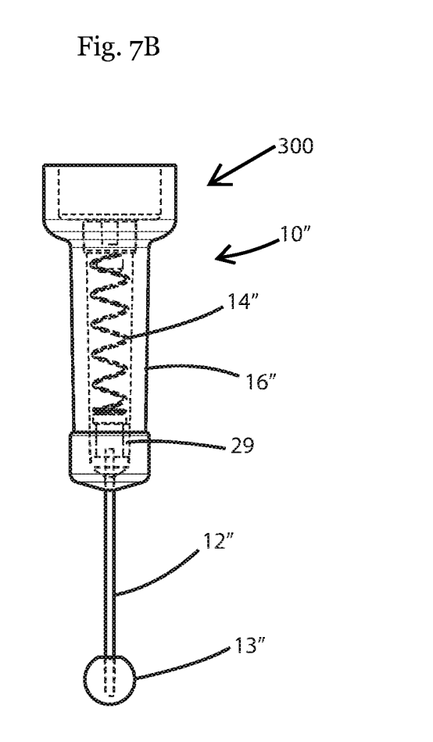

FIGS. 7A-7B include cross-sectional views of an injection simulation device 10" embodiment 300 including a housing 16" an injection simulation member 12" having a ball portion 13" at its distal end. A resistance mechanism is provided, including an injection simulation member interfacing portion 29 which interfaces with an inner surface of the housing 16". The injection simulation member interfacing portion 29 is shown as associated with the stopper portion of the injection simulation member 12", but may be provided on any portion of the injection simulation member 12", or associated with any portion of the member 12". The injection simulation member interfacing portion 29 may be formed of a material so as to create a resistance on the movement of the injection simulation member 12" as it is retracted in an embodiment. In another embodiment, the injection simulation member interfacing portion 29 may include a surface characteristic providing a resistance as it contacts an inner surface of the housing 16", for example. The resistance created as the injection simulation member 12" is retracted simulates that of an injection by mimicking the resistance or force created during deformation, puncture, and/or insertion of a needle into a tissue of a patient, for example.

Figure 8A:
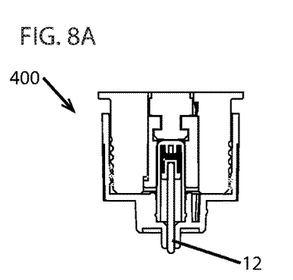
FIGS. 8A-D include various sectional views of a distal end of an auto-injector embodiment of an injection simulation device.
Figure 8B:
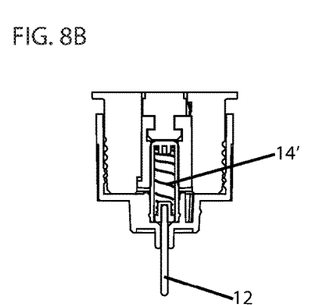
Figure 8C:
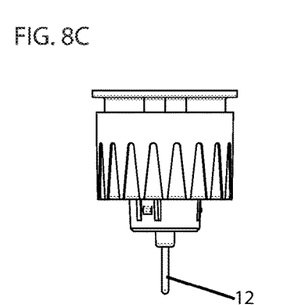
Figure 8D:
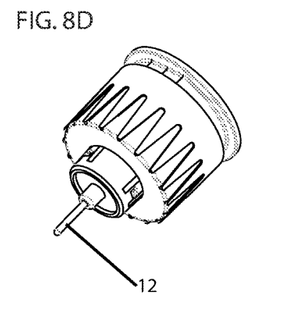

In the sectional views provided in FIGS. 8A-D, a distal portion of an auto-injector embodiment 400 of an injection simulation device is shown. The injection simulation member is provided, and a biasing member 14' is shown in FIG. 8B. The injection simulation member 12 moves from an extended position as shown in FIGS. 8B-D to a retracted position as shown in FIG. 8A upon application of force on the injection simulation member 12 to simulate a deformation force and/or an insertion force of an injection.

Figure 9:
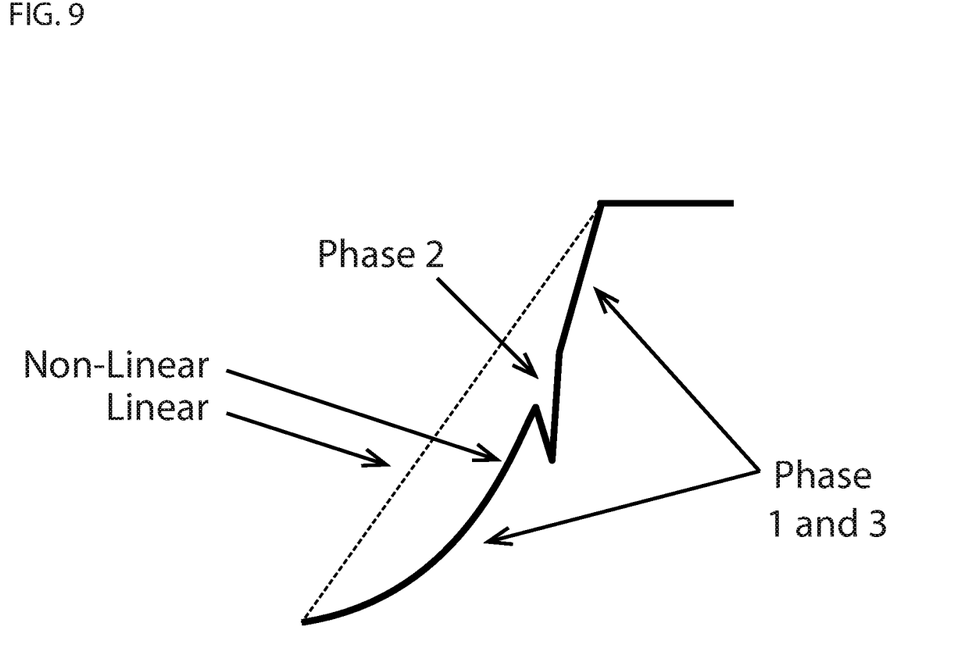
FIG. 9 provides a graph illustrating an example of a multi-phase force profile of an injection.

FIG. 9 provides a graph illustrating an example of a multi-phase force profile of an injection, including a first phase, a second phase and a third phase, in a non-limiting embodiment. The multi-phase force profile may be simulated by embodiments of the injection simulation device as described herein. The first phase may simulate a deformation force, the second phase may simulate a puncture force, or a puncture force and puncture rebound force, and the third phase may simulate an insertion force of an injection, in non-limiting embodiments.

Figure 10A:
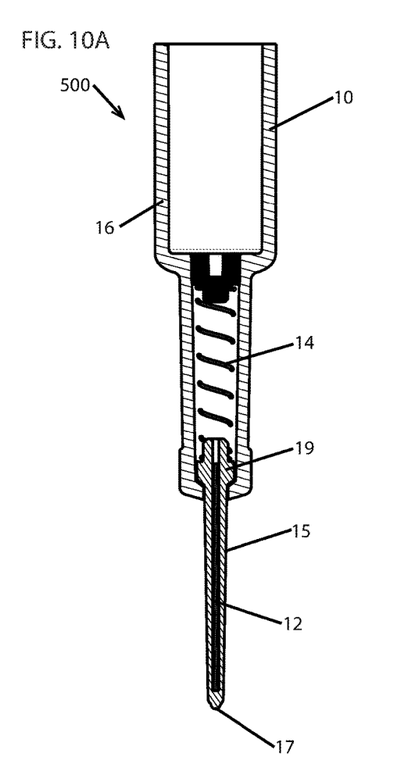
FIGS. 10A-B provide cross-sectional and perspective views of a further embodiment of an injection simulation device having an injection simulation member, wherein the injection FIG. 11 provides a cross-sectional view of an embodiment of an injection simulation device with an additional protrusion.
Figure 10B:
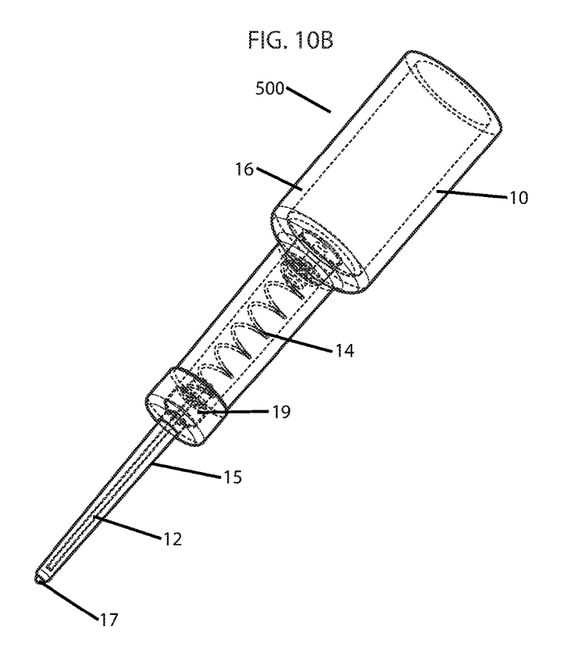

FIG. 10A includes a cross-sectional view and FIG. 10B is a perspective view of a further embodiment 500 of an injection simulation device 10 having a housing 16, a biasing member 14, an injection simulation member 12 and a cover portion 15 surrounding at least a portion of the injection simulation member. The cover portion 15 may be configured to surround the entire injection simulation member 12 or just a portion thereof. The cover portion may include a transparent material, in a non-limiting embodiment, such that a user of the device 10 may view the injection simulation member 12 through the cover portion 15 during use of the injection simulation device 10. The cover member 15 may further include a protruded portion 17 at its distal end, wherein said protruded portion 17 is configured to simulate a tactile feel of an injection and to provide a force at the protruded portion 17 to accurately simulate the force required during an injection with a needle-containing device. A flange portion 19 may be provided at or near a proximal end of the injection simulation member 12 or cover portion 17, or at or near a distal end of the housing 16, or a combination thereof, to prevent the injection simulation member 12 and/or cover portion 15 from being released or removed from the housing 16 entirely, during use of the injection simulation device 10. The flange portion may be used in a non-limiting embodiment, to retain the proximal end of the injection simulation member and/or cover portion within the housing 16, when the injection simulation member 12 is in an extended position as shown in FIGS. 10A-B.

FIGS. 11-16 provide cross-sectional views of an additional embodiment of an injection simulation device 400, including an injection simulation device housing 410, an injection simulation member 412 slidably engaged with the device housing 410. The injection simulation member 412 includes a proximal end 414 and a distal end 416, the distal end 416 for interacting with a target area of a user 490 (i.e., a user's skin), and the proximal end 414 including at least one protrusion 425. An additional protrusion 422 is shown in FIGS. 11-13, wherein the additional protrusion 422 is provided such that the injection simulation member 412 can be retained in the injection simulation device housing 410 during use. The injection simulation member 412 is configured to be retracted from an extended position as shown in FIG. 11 to a first and/or second retracted position as shown in FIG. 12 and FIG. 13, respectively, for example, in response to a force on the injection simulation member 412. A resistance mechanism to simulate one or more forces applied during an injection event is also provided, wherein upon application of a force onto the distal end 416 of the injection simulation member, the injection simulation member 412 is retracted, and a resistance increases to simulate a deformation force until at least the first retracted position is reached. This first retracted position may be reached, in one non-limiting embodiment, when the at least one protrusion 425 traverses a resistance member 418 in the device housing 410 so as to simulate a puncture, followed by a puncture rebound force, which is the force encountered once a needle punctures through, i.e., traverses, the skin. This puncture rebound force is simulated as a decrease in force sensed by a user.

Therefore, upon reaching the first retracted position, the resistance may decrease slightly to simulate a puncture rebound force. This decrease in resistance occurs once the at least one protrusion 425 has traversed the resistance member 418. The injection simulation member 412 may continue to be retracted into the injection device housing 410. The resistance mechanism includes the resistance member 418 and/or the interaction between the resistance member 418 and the protrusion 425, in one non-limiting embodiment. A biasing member 420 is disposed within the device housing 410, such that following the decrease in resistance (i.e., the puncture rebound force), a further force on the distal end 416 of the injection simulation member 412 biases the biasing member 420 to cause an increase in resistance sensed by a user as the injection simulation member 412 is further retracted to simulate an insertion force. This resistance continues until at least a second retracted position is reached as seen in FIG. 13, for example.

In one non-limiting example, retraction of the injection simulation member 412 may include movement of the at least one protrusion 425 relative to the resistance member 418, so as to cause a resistance to simulate a deformation or other force. The simulated force will be sensed by the user of the device. In this example, the traversal of the protrusion 425 past the resistance member 418 causes the resistance, simulating that which is felt when a user uses an injection device having a needle, which deforms the skin in a first phase of injection until the needle traverses (i.e., punctures) the skin, for example. In one non-limiting example, the resistance member 418 may include a rubber gasket configured to provide a resistance as the injection simulation member 412 moves relative to the resistance member 418. Other types of materials known to those skilled in the art may be used as the resistance member 418, for example, various materials having textured or non-textured surfaces may be provided to control the resistance created.

Further resistance may be provided by the biasing member 420, as shown in FIGS. 12-13 until the injection simulation member 412 reaches a retracted position (FIG. 13). Additional resistance may be caused by the contact between the resistance member 418 and the exterior surface of the injection simulation member 412 as the injection simulation member 412 is retracted (FIGS. 12-13), in a non-limiting embodiment. This resistance may be adjustable based on the position, material, and surface treatment of the resistance member 418, as aforementioned, and/or the injection simulation member 412.

Figure 14:
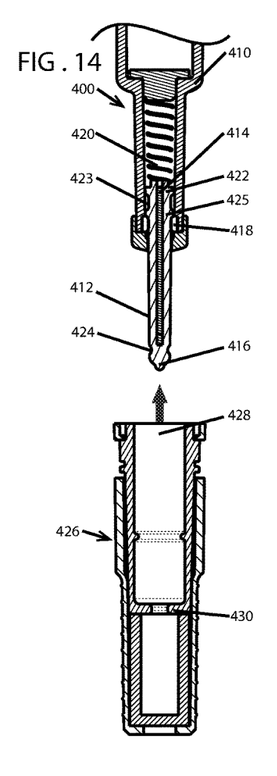
FIG. 14 provides a cross-sectional view of the embodiment of the injection simulation device show in FIG. 11 and a reset cap.
Figure 15:
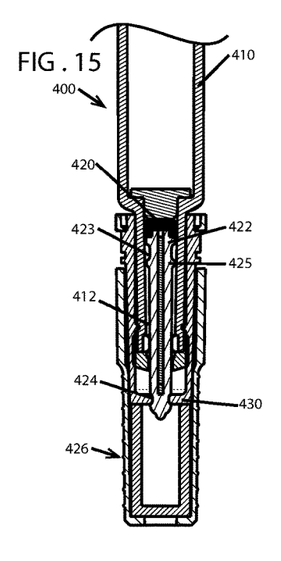
FIG. 15 provides a cross-sectional view of the embodiment of the injection simulation device shown in FIG. 14, wherein the device is interacting with a reset cap.
Figure 16:
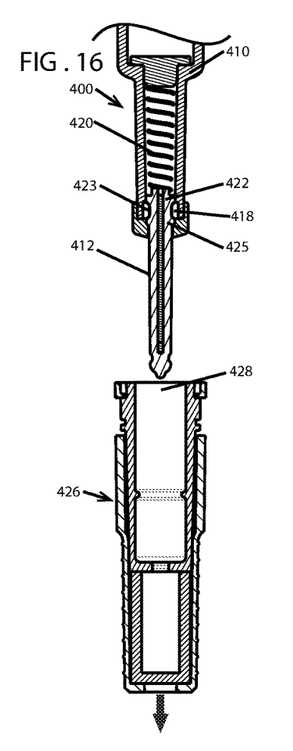
FIG. 16 provides a cross-sectional view of the embodiment of the injection simulation device and reset cap shown in FIG. 15, wherein the rest cap is removed from the device. imulation member is shown in an extended position.

FIGS. 14-16 demonstrate resetting of the injection simulation device embodiment 400 shown in FIGS. 11-13. FIGS. 14-16 shown a reset cap 426, which may be used to reset the device 400, in non-limiting embodiments as described herein. In other non-limiting embodiments, the device 400 may be reset manually by a user, wherein the use may pull the distal end 416 of the injection simulation member 412 away from the injection simulation device housing 410, to reset the injection simulation member 412 to an extended position for a subsequent use. Other methods for resetting the device embodiment 400 are also provided herein.

FIGS. 14-16 provide cross sectional views of the injection simulation device embodiment 400, wherein in FIG. 14, the injection simulation device housing 410 is provided with the reset cap 426 disposed below the injection simulation member 412. The cap mating region 424 of the injection simulation member 412 extends below the device housing 410, so as to be accessible for reset of the device 400. The reset cap 426 includes an opening 428 for receiving at least a portion of the injection simulation member 412, and an injection simulation member mating region 430 of the reset cap 426 is configured to associate with the cap mating region 424 of the injection simulation member 412 distal end 416 (as shown in FIG. 15) when the reset cap 426 is placed over the injection simulation member 412 to reset the device 400 as shown by the arrow in FIG. 14. Following association of the injection simulation member mating region 430 with the cap mating region 424 to reset the device 400 from a retracted position as shown in FIG. 15 to a reset, extended position as provided in FIG. 16, the reset cap 426 may be moved away from the device housing 410, sliding the injection simulation member 412 away from the device housing 410 to reset the injection simulation member 412 to the extended position in preparation for a subsequent use.

Following reset of the injection simulation member 412, the reset cap 426 may be removed from the injection simulation member 412 as shown in FIG. 16.

In non-limiting embodiments, as described herein, the resistance member 418 may include a rubber material, a material having a textured surface, or any other type of material, that when in contact with the injection simulation member would create a resistance for a user of the device 410. In other non-limiting embodiments, the injection simulation member 410 may include a transparent or translucent material to allow a user to see through the injection simulation member 410. In some non-limiting embodiments, the injection simulation member 410 may include a hollow member configured to retain a needle 411 there within. Consequently, a user may avoid contact with the needle 411 of the device 400 due to the surrounding injection simulation member 410, but may be able to visualize the needle 411 during use of the injection simulation device 400 during use to further simulate an injection event, wherein the needle is often visible to a user during an injection. In a further non-limiting embodiment, the injection simulation member comprises a generally conical shape or a cylindrical shape, for example. In still an embodiment, the injection simulation member may include a generally spherically shaped portion at its distal end.

In another non-limiting embodiment, a method for simulating an injection is provided including providing an injection device having a housing and an injection simulation member slidably engaged with the housing, applying a force to a distal end of the injection simulation member to retract the injection simulation member from an extended position, wherein the force applied to the distal end of the injection simulation member is sufficient to overcome differential resistances of the injection device, and said force is representative of a force required for application on an injection medicament delivery device, and wherein the differential resistances are provided based on a multi-phase profile configured to simulate a first phase configured to simulate a deformation force of pressing a needle against a subject so as to deform at least a first layer of tissue prior to traversing at least the first layer of tissue of the subject, a second phase configured to simulate a puncture rebound force, and a third phase configured to simulate an insertion force.

The method further includes wherein the differential resistances simulate forces encountered when injecting using an medicament-containing injection device comprising factors consisting of at least one of: injection angle, needle length, needle point, needle coating, lubrication of needle or injection site, needle depth into composite tissue, or a combination thereof.

In a further non-limiting embodiment, the method includes applying a force to the distal end of the injection simulation member, wherein as the injection simulation member is retracted, a resistance increases to simulate a deformation force until at least a first retracted position is reached, wherein upon reaching the first retracted position, the resistance decreases to simulate a puncture rebound force, and continuing to apply a force to the distal end of the injection simulation member, wherein following the decrease in resistance, a biasing member in the device housing causes an increase in resistance as the injection simulation member is further retracted to simulate an insertion force until at least a second retracted position is reached.

In still a further embodiment, an injection simulation device configured to simulate one or more forces applied to an injection device during an injection event is provided. The injection simulation device including a housing, an injection simulation member, the injection simulation member configured to be retracted from an extended position to a retracted position in response to a force on the injection simulation member, and a resistance mechanism, wherein the resistance mechanism provides one or more resistance values as the injection simulation member is retracted to simulate one or more forces applied during an injection event, wherein the resistance increases as the injection simulation member is retracted to simulate an insertion force according to: $F(x)=K*X^P$ wherein $F(x)$ is a force value at a point between the extended position and the retracted position, K is a resistance value comprising a resistance of the injection simulation device, X is a displacement value, and P is an exponential power value greater than zero. In an embodiment, the retracted position comprises a fully retracted position.

In one embodiment, as the P value increases, the force value increases exponentially. In a non-limiting embodiment, the P value may range between 0.5 and 4. In a non-limiting embodiment, the X value may range between 0.000001 mm and 250 mm.

In a further embodiment, the resistance mechanism of the injection simulation device includes a biasing member for providing a resistance on the retraction of the injection simulation member to simulate an insertion force as the force is applied to the injection simulation member to retract the injection simulation member. In one non-limiting embodiment, the biasing member may include a digressive spring. In a further, non-limiting embodiment, the digressive spring may include a Belleville spring, wherein the Belleville spring is compressed as the injection simulation member is retracted and a resistance on the retraction of the injection simulation member increases until the Belleville spring reaches a threshold compression level, wherein upon reaching the threshold compression level, the resistance on the injection simulation device decreases to simulate a force profile of the insertion force. In an embodiment, the biasing member may include a non-linear spring.

In another embodiment, the injection simulation device resistance mechanism may include a first engaging component and a second engaging component. The first engaging component may be associated with the device housing, such as in a non-limiting example, associated with an inner surface of a portion of the device housing, and the second engaging component may be associated with the injection simulation member. In one non-limiting embodiment, the second engaging component may be a protrusion on the injection simulation member, in another embodiment, the second engaging component may include a surface texture, or a particular material, such as a rubber material in a non-limiting example, on at least a portion of the second engaging component. The first and second engaging components are configured to move relative to one another as the injection simulation member is retracted into the device housing to provide a resistance to simulate an insertion force.

In a further non-limiting embodiment, the resistance mechanism may include a pneumatic component, wherein as the injection simulation member is retracted from an extended position upon an application of a force, an increase in air compression in the injection simulation housing occurs. The increase in air compression in the housing causes a resistance on the retraction of the injection simulation member to simulate the insertion force. An increase in air pressure occurring within the housing due to the retraction of the injection simulation member causes an increase in force, i.e., a pneumatic pressure build up to simulate an injection.

In still a further embodiment, an injection simulation device is provided having a housing and a retractable injection simulation member, said injection simulation member configured to simulate a needle of an injection device with a determined gauge (G) and which device is configured such that the injection simulation member retracts from an extended position to a retracted position under application of a $force_1$ (N), to simulate a insertion force ($Force_i$) according to the following formula: $Force_i=2[C(-0.046(G)+1.83)]$, wherein the force value ranges between +/−1%-30% and every integer in between, and wherein C comprises a coefficient, said coefficient being a factor of the insertion force of the injection simulation device. The force value may range between +/−1%-20% and every integer in between. In another embodiment, the force values ranges +/−1%-10% and every integer in between. The insertion force ($Force_i$) includes the force required to retract the injection simulation member from an extended position to a retracted position. In one embodiment, the coefficient C value decreases when a longitudinal axis of the injection simulation member is generally perpendicular to a plane in which a surface comprising the injection site is disposed, and increases when an angle between the longitudinal axis of the injection simulation member and the plane in which the surface comprising the injection site decreases. In an embodiment, the retracted position includes a fully retracted position.

In one particular embodiment, the C value comprises 1.0 when the angle between the longitudinal axis of the injection simulation member and the plane of the surface comprising the injection site comprises 90 degrees. In another embodiment, the C value comprises 1.4 when the angle between the longitudinal axis of the injection simulation member and the plane of the surface comprising the injection site comprises 45 degrees. The table below includes non-limiting examples of data points obtained which include needle gauge (G) values, angle of injection (90 degrees) and a peak force range in Newtons, which includes a force of insertion of the needle to a fully inserted position, which is simulated with the injection simulation device embodiments provided herein, such that the peak force range corresponds to the $Force_i$, i.e., retraction of the injection simulation member from an extended to a retracted position.

| Summary | | |
|---|---|---|
| Needle Gauge | Angle (Flat) (Degrees) | Peak Force Range (Newtons) |
| 18 (Regular) | 90 | 2.35-2.95 |
| 18 (Short) | 90 | .95-3.25 |
| 25 | 90 | 1.45-2.45 |
| 30 | 90 | .9-1.95 |

It should be borne in mind that all patents, patent applications, patent publications, technical publications, scientific publications, and other references referenced herein are hereby incorporated by reference in this application in order to more fully describe the state of the art to which the present invention pertains.

It is important to an understanding of the present invention to note that all technical and scientific terms used herein, unless defined herein, are intended to have the same meaning as commonly understood by one of ordinary skill in the art. The techniques employed herein are also those that are known to one of ordinary skill in the art, unless stated otherwise. For purposes of more clearly facilitating an understanding the invention as disclosed and claimed herein, the preceding definitions are provided.

While a number of embodiments of the present invention have been shown and described herein in the present context, such embodiments are provided by way of example only, and not of limitation. Numerous variations, changes and substitutions will occur to those of skill in the art without materially departing from the invention herein. For example, the present invention need not be limited to best mode disclosed herein, since other applications can equally benefit from the teachings of the present invention. Also, in the claims, any means-plus-function and step-plus-function clauses are intended to cover the structures and acts, respectively, described herein as performing the recited function and not only structural equivalents or act equivalents, but also equivalent structures or equivalent acts, respectively. Accordingly, all such modifications are intended to be included within the scope of this invention as defined in the following claims, in accordance with relevant law as to their interpretation.

What is claimed is:

1. An injection simulation device comprising a housing and a retractable injection simulation member and a resistance mechanism applying a resistance, said injection simulation member configured to simulate at least a first phase of a multi-phase force profile of a needle of an injection device with a determined gauge (G) and which device is configured such that the injection simulation member retracts, relative to the housing, from an extended position to a first retracted position under application of a force1 (N) against the resistance, wherein the resistance mechanism simulates a deformation force ($Force_d$) according to the following formula:

$$Force_d = C(-0.046(G)+1.83)$$

wherein the $Force_d$ value ranges between +/−1%-30% of $Force_d$ and every integer in between, and wherein C comprises a coefficient, said coefficient being a factor of the deformation force of the injection simulation device.

2. The injection simulation device of claim 1, wherein $Force_d$ ranges +/−1% -20% and every integer in between.

3. The injection simulation device of claim 1, wherein $Force_d$ ranges +/−1% -10% and every integer in between.

4. The injection simulation device of claim 1, wherein retraction of the injection simulation member from the extended position to the first retracted position comprises a force determined by:

$$F(x)=K*X^P$$

wherein F(x) is a force value in the multi-phase force profile occurring at a point between the extended position and the first retracted position, K is a resistance value provided by the resistance mechanism, X is a displacement value of the retractable injection simulation member, and P is an exponential power value greater than zero.

5. The injection simulation device of claim 1, wherein the deformation force $Force_d$ depends on coefficient C, comprising: a composite area of injection value (C1), a bevel of the needle value (C2), lubrication of the needle or an injection site value (C3), and/or injection angle (C4) wherein the coefficient C ($Force_d$) is determined by:

$$C=C1*C2*C3*C4.$$

6. The injection simulation device of claim 5, wherein a higher C1 value simulates use of an injection device on a composite area of injection comprising a more dense tissue area and a lower C1 value simulates use of an injection device on a composite area of injection comprising a less dense tissue area.

7. The injection simulation device of claim 5, wherein when the composite area of injection includes a subcutaneous tissue, the C1 value ranges from 0.5-2.0.

8. The injection simulation device of claim 5, wherein when the injection simulation device is configured to simulate a force based on a needle bevel, the C2 value is higher when a needle with a bevel that creates a larger angle at a distal end of the needle is simulated, and lower when a needle with a bevel that creates a smaller angle at the distal end of the needle is simulated.

9. The injection simulation device of claim 8, wherein the C2 value ranges from between 0.5-1.5.

10. The injection simulation device of claim 5, wherein the injection simulation device is configured to simulate a force based on lubrication or non-lubrication of a needle or an injection site, and wherein the C3 value is higher when an un-lubricated needle and/or injection site is simulated and lower when a lubricated needle and/or injection site is simulated.

11. The injection simulation device of claim 10, wherein the C3 value ranges from between 0.5-1.0.

12. The injection simulation device of claim 5, wherein the C4 value is smaller when a longitudinal axis of the injection simulation member is generally perpendicular to a plane in which a surface comprising the injection site is disposed, and is larger when longitudinal axis of the injection simulation member is not perpendicular to the plane of the surface comprising the injection site.

13. The injection simulation device of claim 12, wherein the C4 value comprises 1.0 when the angle between the longitudinal axis of the injection simulation member and the plane of the surface comprising the injection site comprises 90 degrees.

14. The injection simulation device of claim 12, wherein the C4 value comprises 1.4 when the angle between the longitudinal axis of the injection simulation member and the plane of the surface comprising the injection site comprises 45 degrees.

15. The injection simulation device of claim 4, wherein as the P value increases, the force value increases exponentially.

16. The injection simulation device of claim 15, wherein the P value ranges between 0.5 and 4.

17. The injection simulation device of claim 4, wherein the X value ranges between 0.000001 mm and 250 mm.

* * * * *